(12) United States Patent
Chou

(10) Patent No.: US 8,072,099 B2
(45) Date of Patent: Dec. 6, 2011

(54) VOICE COIL MOTOR FOR DRIVING LENS GROUP

(75) Inventor: Tai-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 132 days.

(21) Appl. No.: 12/749,477

(22) Filed: Mar. 29, 2010

(65) Prior Publication Data

US 2011/0037326 A1   Feb. 17, 2011

(30) Foreign Application Priority Data

Aug. 14, 2009   (CN) .......................... 2009 1 0305666

(51) Int. Cl.
*H02K 41/035* (2006.01)
*G02B 7/02* (2006.01)

(52) U.S. Cl. .................. 310/12.16; 310/12.31; 359/819; 359/824

(58) Field of Classification Search .... 310/12.01–12.33; 359/819, 606, 824, 823, 814

See application file for complete search history.

(56) References Cited

U.S. PATENT DOCUMENTS 7,391,579 B2 *   6/2008   Ho et al. ....................... 359/696
7,944,631 B2 *   5/2011   Sata et al. ..................... 359/819

\* cited by examiner

*Primary Examiner* — Quyen Leung
*Assistant Examiner* — Leda Pham
(74) *Attorney, Agent, or Firm* — Altis Law Group, Inc.

(57) ABSTRACT

A voice coil motor includes a base, a shell, first and second magnetic members, a lens retainer, a coil of wire mounted on the retainer, first and second elastic members. The base includes a bottom and posts extending upwards from the bottom. The shell includes a top and sidewalls cooperatively defining a receiving space therein. The shell is mounted on the base with the posts being received in the receiving space. The first magnetic members are positioned on the bottom of the base, the second magnetic members are positioned on the top of the shell, and each two adjacent of the posts have one of the first magnetic members and one of the second magnetic members located therebetween. The first resilient member and a second resilient member each include fixing portions fixed to the posts, and a spring portion connected to retainer between the first and second magnetic members.

11 Claims, 4 Drawing Sheets

VOICE COIL MOTOR FOR DRIVING LENS GROUP

BACKGROUND

1. Technical Field

The present disclosure relates to voice coil motors, and particularly to a voice coil motor that can drive a lens group.

2. Description of Related Art

Voice coil motors are widely used as actuators for driving lenses in camera modules.

A typical voice coil motor includes a number of magnetic members mounted on a bracket, a lens retainer movably received in the bracket and surrounded by magnetic members, and a number of coils of wire mounted on the lens retainer.

However, with the above-described configuration, because the magnetic members surround the lens retainer, radius of the voice coil motor is greatly enlarged, and the size of the lens is limited.

What is needed, therefore, is a voice coil motor which can overcome the above shortcomings.

BRIEF DESCRIPTION OF THE DRAWINGS

Many aspects of the present voice coil motor can be better understood with reference to the following drawings. The components in the drawings are not necessarily drawn to scale, the emphasis instead being placed upon clearly illustrating the principles of the present voice coil motor. Moreover, in the drawings, like reference numerals designate corresponding parts throughout the several views.

DETAILED DESCRIPTION

Embodiments of the present voice coil motor will now be described in detail below and with reference to the drawings.

Figure 1:
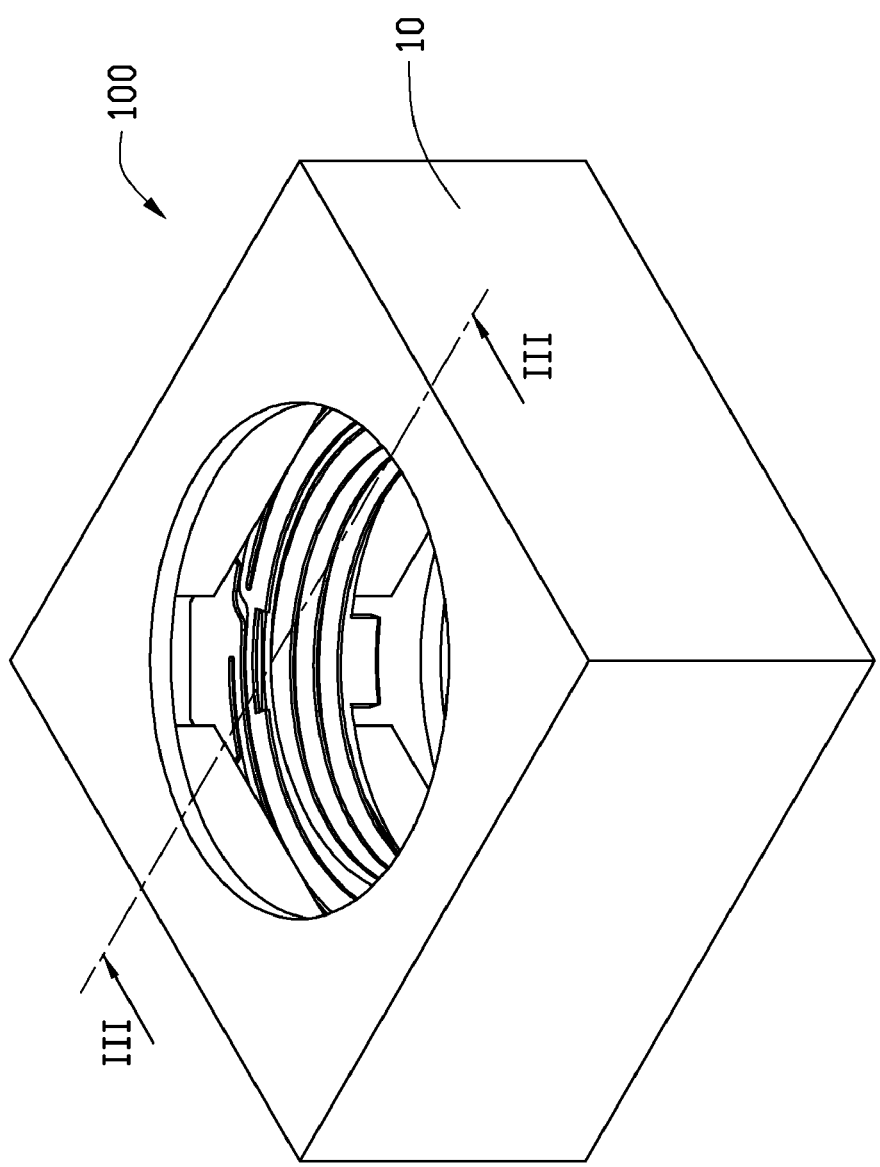
FIG. 1 is a schematic view of a voice coil motor in accordance with an embodiment.
Figure 2:
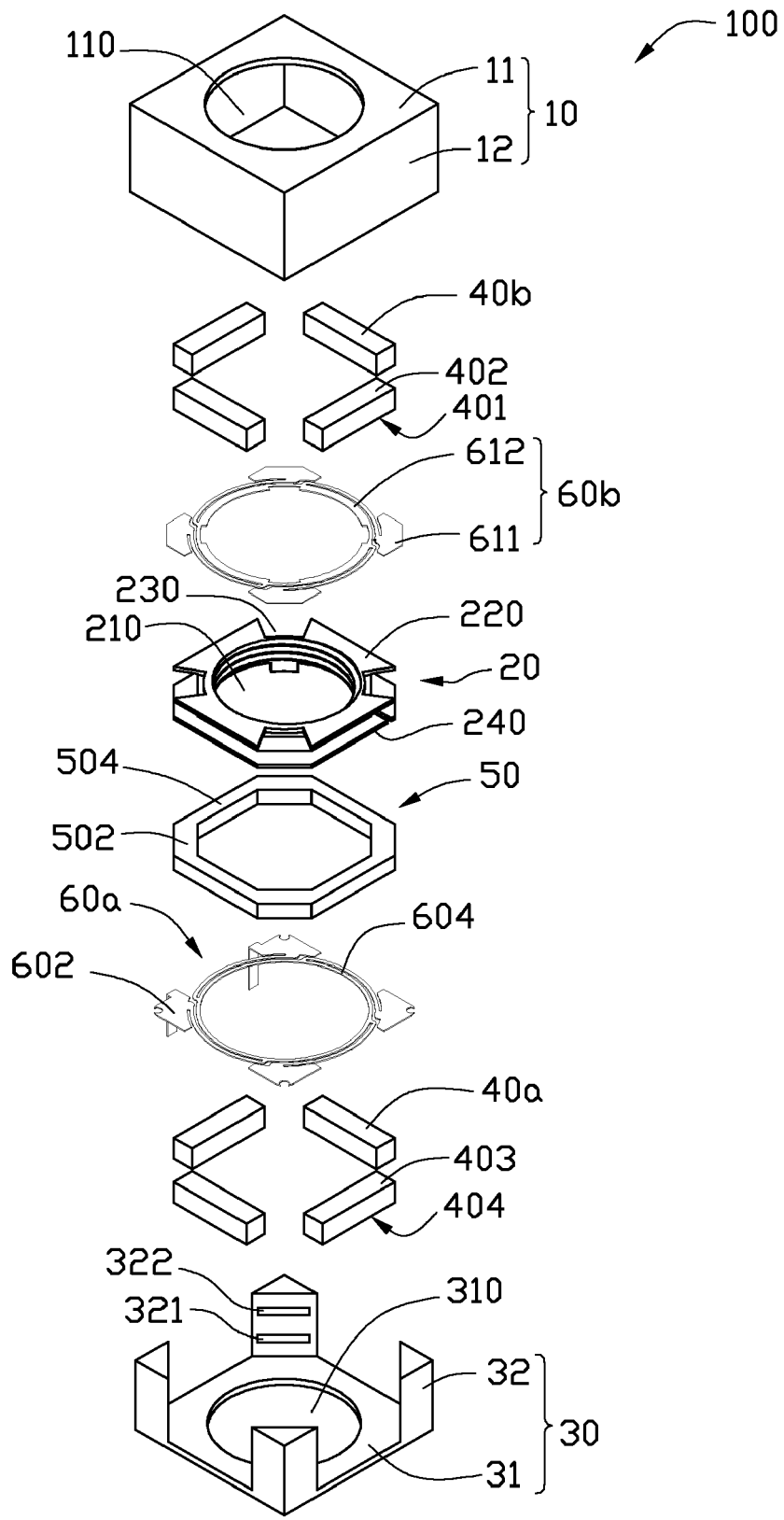
FIG. 2 is an exposed view of the voice coil motor shown in FIG. 1.
Figure 3:
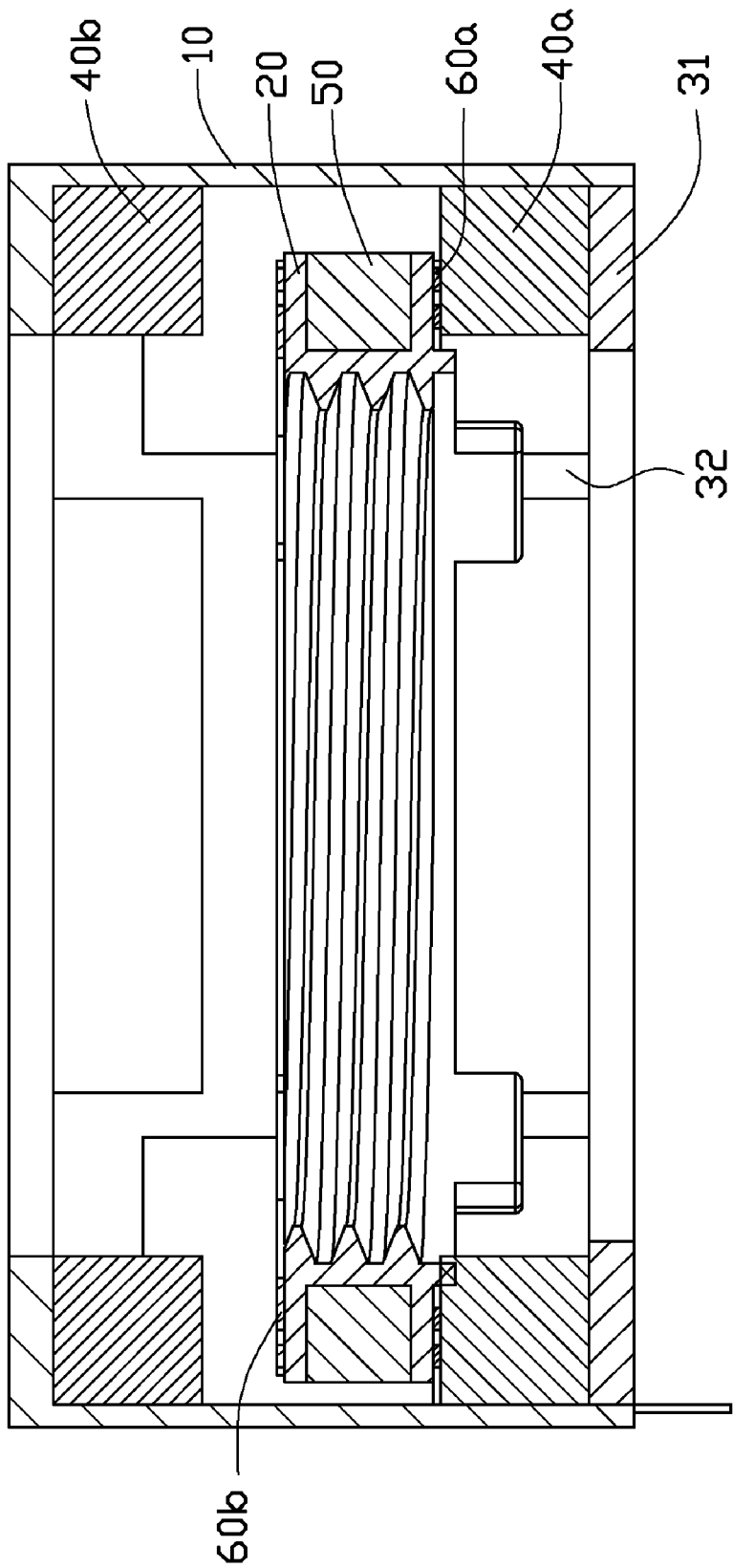
FIG. 3 is a cross-sectional view of the voice coil motor of FIG. 1, taken along the line III-III.

Referring to FIGS. 1 to 3, a voice coil motor 10 includes a base 30, a shell 10, four first magnetic members 40a, four second magnetic members 40b, a retainer 20, a coil of wire 50, a first resilient member 60a and a second resilient elastic member 60b.

The base 30 includes a square bottom 31, and four posts 32 extending from four corners of the bottom 31. The bottom 31 defines a central through hole 310 therein. Each of the posts 32 has a plane surface facing one of the other posts 32. Each of the posts 32 includes a first groove 321 and a second groove 322 formed therein. The shell 10 includes a top 11 and four sidewalls 12. The top 11 defines a central through hole 110 therein. The shell 10 is mounted to the base 30, and the top 11, the sidewalls 12 and the bottom 31 cooperatively form a receiving space therein, and the posts 32 are received in the receiving space.

The first magnetic members 40a and the second magnetic members 40b are permanent magnets. The first magnetic members 40a are positioned on the bottom 31, and two adjacent of the posts 32 have one of the first magnetic members 40a located therebetween. The second magnetic members 40b are positioned on the top 11, and each two adjacent posts 32 have one of the second magnetic members 40b located therebetween. In the present embodiment, the bottom 31 and the top 11 are made of magnetic material, such that the first and second magnetic members 40a, 40b can be secured thereon. Each of the first magnetic members 40a has a first side 401 facing the second magnetic members 40b, and the first sides 401 substantially have a same single magnetic polarity, such as N polarity. Each of the first magnetic members 40a has a second side 402 which is opposite to the first side 401 and substantially has an opposite single magnetic polarity. Each of the second magnetic members 40b has a third side 403 facing the first magnetic members 40a, and third sides 403 substantially have a same single magnetic polarity which is the same as the first sides 401 of the first magnetic members 40a. Each of the second magnetic members 40b has a fourth side 404 which is opposite to the third side 403 and substantially has an opposite single magnetic polarity. The first and second magnetic members 40a, 40b can be made by a magnetization method, and the sizes thereof can be changed according to need.

The retainer 20 has a through hole 210 defined therein, and the inner wall of the through hole has a thread formed therein. Four first tabs 220 extend from a top surface of the retainer 20, and a gap 230 is maintained between each two adjacent of the first tabs 220. Two second tabs 240 extend from a bottom surface of the retainer 20. The outer wall of the retainer 20 between the first tabs 220 and the second tabs 240 is polygon-shaped.

The coil of wire 50 is also polygon-shaped, and includes four short sides 502 and four long sides 504. The coil of wire 50 is mounted on the outer wall of the retainer 20 and is sandwiched between the first tabs 220 and the second tabs 240. The short sides 502 are aligned with the gaps 230, the long sides 504 are aligned with the first tabs 220 and aligned with the respective first and second magnetic members 40a, 40b.

The first and second resilient members 60a, 60b are located between the first and second magnetic members 40a, 40b. The first resilient member 60a includes four fixing portions 602 engaged in the first grooves 321, and a spring portion 604 connected to the top of the retainer 20. The second resilient member 60b includes four fixing portions 611 engaged in the second grooves 322, and a spring portion 612 connected to the bottom of the retainer 20. A number of slots (not labeled) are formed between the fixing portions 602, 611 and the spring portions 604, 612, thus giving the spring portions 604, 612 elasticity. A through hole is formed in each of the first and second resilient members 60a, 60b.

In application, when an electric current is applied to the coil of wire 50, a magnetic field is generated by the coil of wire 50. If the direction of the magnetic field (N to S) is directed to the first magnetic members 40a, and the first sides of the first magnetic members 40a and the third sides of the second magnetic members 40b are in N polarity, the coil of wire 50 together with the retainer 20 is moved towards the first magnetic members 40a. If the direction of the magnetic field (N to S) is directed to the second magnetic members 40b, and the first sides of the first magnetic members 40a and the third sides of the second magnetic members 40b are in N polarity, the coil of wire 50 together with the retainer 20 is moved towards the second magnetic members 40a.

Figure 4:
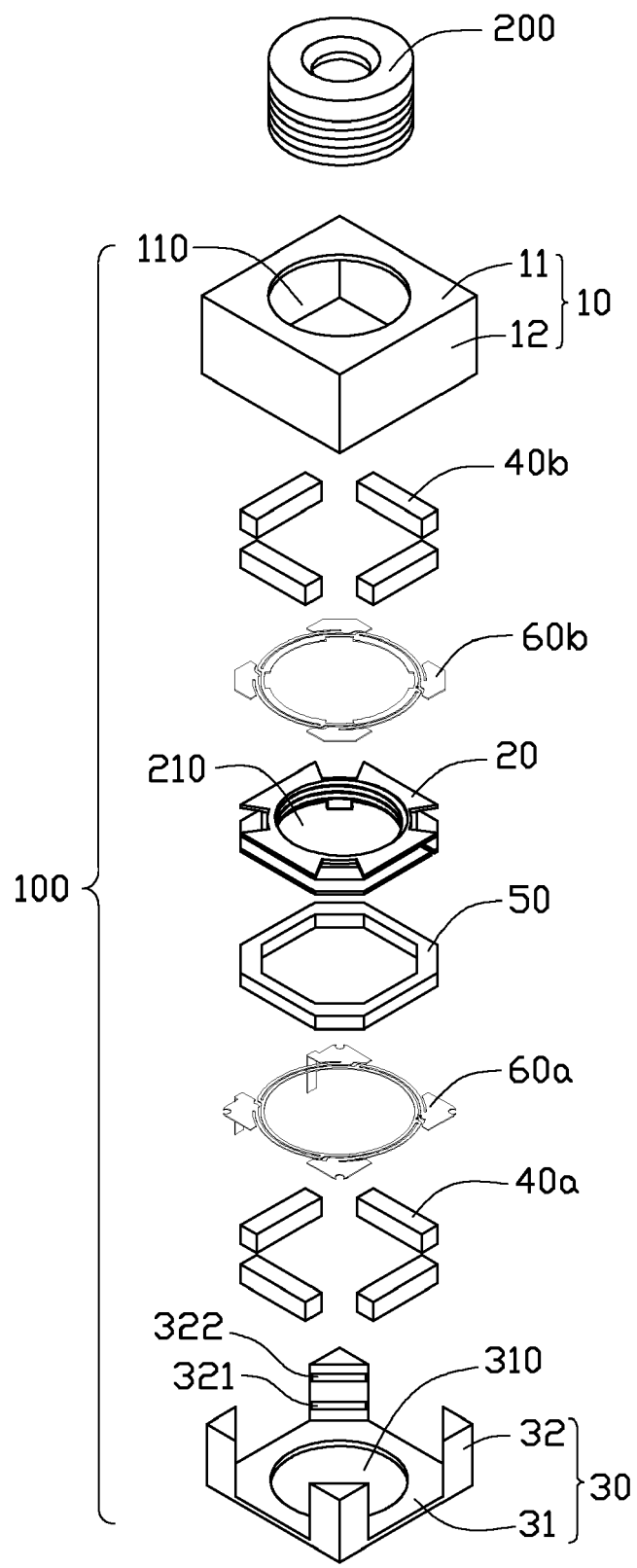
FIG. 4 is schematic view of a lens group to be mounted in the voice coil motor of FIG. 1.

Referring to FIG. 4, a lens group 200 which has a thread formed on an outer wall thereof can be threadedly engaged in the through hole 210 of the retainer 20, thus retained by the retainer 20. The retainer 20 together with the lens group 200 is driven by the magnetic force between the coil of wire 50 and the first magnetic member 40a, and the magnetic force between the coil of wire 50 and the second magnetic member 40b.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A voice coil motor, comprising:
a base comprising a bottom having a through hole defined therein, and a plurality of posts extending upwards from the bottom;
a shell comprising a top having a through hole defined therein, and a plurality of sidewalls, the top and the sidewalls cooperatively defining a receiving space therein, the shell being mounted on the base with the posts being received in the receiving space;
a plurality of first magnetic members positioned on the bottom of the base, each two adjacent posts having one of the first magnetic members located therebetween;
a plurality of second magnetic members positioned on the top of the shell, each two adjacent posts having one of the second magnetic members located therebetween;
a retainer defining a through hole therein;
a coil of wire mounted on an outer wall of the retainer;
a first resilient member and a second resilient member each comprising a plurality of fixing portions fixed to the posts, and a spring portion connected to retainer, the first and second resilient members being located on a top and a bottom of the retainer, and between the first and second magnetic members.

2. The voice coil motor as described in claim 1, wherein an inner wall of the retainer has a thread formed therein.

3. The voice coil motor as described in claim 1, wherein the retainer comprises a plurality of first tabs extending from a top surface thereof, and a plurality of second tabs extending from a bottom surface thereof, the coil of wire being sandwiched between the first and second tabs.

4. The voice coil motor as described in claim 3, wherein an outer wall of the retainer is polygonal, and the coil of wire is polygonal.

5. The voice coil motor as described in claim 1, wherein the first and second magnetic members are permanent magnets, and the first magnetic members and the second magnetic members have a same single magnetic polarity at sides thereof facing the coil of wire.

6. The voice coil motor as described in claim 1, wherein a plurality of slots formed between the fixing portions and the spring portion.

7. A voice coil motor for driving a lens group, the voice coil motor comprising:
a base comprising a bottom having a through hole defined therein, and a plurality of posts extending upwards from corners of the bottom;
a shell comprising a top having a through hole defined therein, and a plurality of sidewalls, the shell being mounted on the base, the bottom of the base, the top of the shell and the sidewalls cooperatively defining a receiving space therein, and the posts being received in the receiving space;
a plurality of first permanent magnets positioned on the bottom of the base, each two adjacent posts having one of the first permanent magnets located therebetween, the first permanent magnets having a same single magnetic polarity at first sides thereof facing the top of the shell;
a plurality of second permanent magnets positioned on the top of the shell, each two adjacent posts having one of the second permanent magnets located therebetween, each of the second permanent magnets having a same single magnetic polarity as the first sides of the first permanent magnets at second sides facing the bottom of the base;
a retainer defining a through hole therein for receiving the lens group;
a coil of wire surrounding the retainer;
a first resilient member and a second resilient member each comprising a plurality of fixing portions fixed to the posts, and a spring portion connected to retainer, the first and second resilient members being located on a top and a bottom of the retainer, and between the first and second magnetic members.

8. The voice coil motor as described in claim 7, wherein an inner wall of the retainer has a thread formed therein, and an outer wall of the lens group has a thread formed thereon.

9. The voice coil motor as described in claim 7, wherein the retainer comprises a plurality of first tabs extending from a top surface thereof, and a plurality of second tabs extending from a bottom surface thereof, the coil of wire being arranged between the first and second tabs.

10. The voice coil motor as described in claim 9, wherein a cross-section of the outer wall of the retainer is polygonal, and a cross-section of the coil of wire is polygonal.

11. The voice coil motor as described in claim 7, wherein a plurality of slots formed between the fixing portions and the spring portion.

* * * * *